United States Patent [19]

Chen et al.

[11] Patent Number: 4,778,856

[45] Date of Patent: * Oct. 18, 1988

[54] BLEND OF POLYVINYL CHLORIDE, CHLORINATED OR CHLOROSULFONATED POLYETHYLENE AND ETHYLENE-CONTAINING TERPOLYMER

[75] Inventors: John C. Chen, Hockessin; Richard T. Chou, Wilmington, both of Del.

[73] Assignee: E. I. Du Pont de Nemours and Company, Wilmington, Del.

[*] Notice: The portion of the term of this patent subsequent to Feb. 23, 2005 has been disclaimed.

[21] Appl. No.: 53,997

[22] Filed: May 26, 1987

[51] Int. Cl.[4] .................. C08L 23/28; C08L 27/06; C08L 23/08
[52] U.S. Cl. .................. 525/190; 525/189; 525/192; 525/239
[58] Field of Search .................. 525/190, 192, 239

[56] References Cited

U.S. PATENT DOCUMENTS

| | | | |
|---|---|---|---|
| 3,845,166 | 10/1974 | Betts et al. | 260/897 |
| 4,280,940 | 7/1981 | Klug et al. | 260/23 A |
| 4,489,193 | 12/1984 | Goswami | 525/190 |
| 4,556,694 | 12/1985 | Wallace | 525/239 |
| 4,677,163 | 6/1987 | Tada et al. | 525/239 |

FOREIGN PATENT DOCUMENTS 0180963 5/1986 European Pat. Off. .
7008507-0 12/1971 Netherlands .

OTHER PUBLICATIONS

Elvaloy ® Resin Modifiers, Du Pont Company, Polymer Products Department, Wilmington, Del. 19898.

*Primary Examiner*—Carman J. Seccuro

[57] ABSTRACT

A polymer composition comprising (a) 35–65 parts by weight polyvinyl chloride, (b) 10–55 parts by weight chlorinated polyethylene or chlorosulfonated polyethylene elastomer or mixtures thereof containing 24–40 weight percent chlorine, (c) 10–55 parts by weight of a chlorinated polyethylene or chlorosulfonated polyethylene elastomer or mixtures thereof containing 40–52 weight percent chlorine with the proviso that the chlorine level of the elastomers (b) and (c) differ by at least 5 weight percent, and (d) 1–30 parts by weight per 100 parts by weight of total chlorinated polymers (a), (b) and (c) of an ethylene terpolymer containing 48–74 weight percent ethylene, 20–40 weight percent vinyl acetate or alkyl acrylate wherein the alkyl group contains 1–10 carbon atoms, and 6–14 weight percent carbon monoxide. Such compositions are useful as pond liners, roofing membranes, wire and cable covering, and window profiles.

14 Claims, No Drawings

BLEND OF POLYVINYL CHLORIDE, CHLORINATED OR CHLOROSULFONATED POLYETHYLENE AND ETHYLENE-CONTAINING TERPOLYMER

BACKGROUND OF THE INVENTION

This invention is directed to a polymer blend containing polyvinyl chloride, two chlorinated elastomers, i.e., chlorinated polyethylene elastomers and/or chlorosulfonated polyethylene elastomers wherein the chlorinated elastomers have different chlorine levels, and certain ethylene-containing terpolymers. The resulting polymer blend shows a significant enhancement in oil swell resistance, and improved low temperature toughness.

Polyvinyl chloride has been blended with chlorinated polyethylene and chlorosulfonated polyethylene in an attempt to improve the physical properties of the polyvinyl chloride. The blending approach has been utilized in an attempt to fulfill the increasing need for polymers that are melt processible, have good mechanical strength, chemical and oil resistance, high impact resistance, and good low temperature properties. However, because of inherent deficiencies of the system, many blends suffer critical property shortcomings such as an inadequate balance between oil swell resistance and low temperature toughness, which limits commercial applications for the compositions. It is thought that the fundamental cause of the problem is the insufficient interphase stability of the blend system due to the inadequate physical compatibility between the component polymers. There is a need in the industry for an elastomeric blend of polymers having a combination of outstanding resistance to oil swell balanced with superior low temperature properties.

SUMMARY OF THE INVENTION

It has now been discovered that when a particular ethylene containing terpolymer is incorporated in a blend of polymers containing polyvinyl chloride and two chlorinated elastomers having different levels of chlorine, interphase compatibilization is significantly enhanced resulting in the blends having improved oil swell resistance, and resistance to fracture at low temperatures. More specifically, the present invention is directed to a polymer composition comprising (a) 35–65 parts by weight polyvinyl chloride,
(b) 10–55 parts by weight of a chlorinated elastomer selected from the group consisting of a chlorinated polyethylene elastomer or a chlorosulfonated polyethylene elastomer or mixtures thereof wherein the total amount of chlorine substituted on the chlorinated elastomer is from 24–40 weight percent,
(c) 10–55 parts by weight of a chlorinated elastomer selected from the group consisting of either a chlorinated polyethylene elastomer or a chlorosulfonated polyethylene elastomer or mixtures thereof wherein the total amount of chlorine substituted on the chlorinated elastomers is from 40–52 weight percent,
with the proviso that the chlorine level in elastomers (b) and (c) differ by at least 5 weight percent, and
(d) 1–30 parts by weight per 100 parts by weight of total chlorinated polymers (a), (b) and (c) of an ethylene terpolymer containing 48–74 weight percent ethylene, 20–40 weight percent vinyl acetate or alkyl acrylate wherein the alkyl group contains 1–10 carbon atoms, and 6–14 weight percent carbon monoxide.

Preferably, the composition contains about 40–60 parts by weight polyvinyl chloride, 12–35 parts by weight of a first chlorinated or chlorosulfonated polyethylene elastomer having 29–36 weight percent chlorine, 12–35 parts by weight of a second chlorinated or a chlorosulfonated polyethylene elastomer having 42–47 weight percent chlorine, wherein the chlorine levels of the first and second elastomers differ by at least 7 weight percent, and 5–25 parts by weight per 100 parts by weight of total chlorinated polymers (a), (b) and (c) of the ethylene terpolymer containing 55–65 weight percent ethylene, 25–35 weight percent alkyl acrylate or vinyl acetate and 8–12 weight percent carbon monoxide. These polymer blends have excellent oil resistance and are resistant to fracture or cracking at low temperatures. The polymer blends are especially useful for pond liner applications, wire and cable covering, roofing membranes, and window profiles.

DETAILED DESCRIPTION OF THE INVENTION

The polymer compositions of this invention contain about 35–65 parts by weight, preferably 40–60 parts by weight, polyvinyl chloride. Polyvinyl chloride can be prepared as described in the literature, or patents, such as, for example, in U.S. Pat. Nos. 2,381,388; 2,434,231; 2,491,491; or 2,624,718. While it is not essential, usually the polyvinyl chloride has an inherent viscosity of from about 0.6–0.85 as determined by ASTM D1243-66T, Method A.

The polymer composition also contains two chlorinated polyethylene elastomers, or two chlorosulfonated polyethylene elastomers, or one chlorinated polyethylene elastomer and one chlorosulfonated polyethylene elastomer, each elastomer differing in degree of chlorination. One of the chlorinated or chlorosulfonated polyethylene elastomers has a chlorine content of 24–40 weight percent preferably 29–36 weight percent. The other percent chlorinated elastomer has a chlorine content of 40–52 weight percent, preferably 42–47 weight percent. The chlorine levels of the two elastomers must differ by at least 5 weight percent, preferably by at least 7 weight percent. When a chlorosulfonated polyethylene elastomer is used as a component of the composition, the elastomer has a sulfur content of from about 0.2 to 5 weight percent.

Chlorinated polyethylene used in the polymer blend can be prepared by chlorinating polyethylene with gaseous chlorine in a solution process or in a suspension process to reach the desired level of substitution of chlorine atoms on the polyethylene. These procedures for making chlorinated polyethylene are well known in the industry and they are described, for example, in U.S. Pat. Nos. 2,398,803, 2,748,105, 3,060,164, 2,592,763, and 2,890,283.

The chlorosulfonated polyethylenes used in the composition can be made by conventional processes for chlorosulfonating polyethylene. The resulting chlorosulfonated polyethylene usually has a density of at least 0.88 g/cc and in most cases, at least about 0.92 g/cc. The polyethylene used to make the chlorosulfonated elastomer may either be high density linear or low density polyethylene. Although it is preferable to use polyethylene homopolymer, the polyethylene may also contain a higher alpha-olefin comonomer containing 3–10 carbon atoms, such as butene-1 or octene-1, in amounts up to about 10% by weight.

The chlorosulfonated polyethylene is prepared by chlorinating polyethylene in the presence of a chlorosulfonating agent such as gaseous chlorine and sulfur dioxide. Alternatively, the chlorination and chlorosulfonation reactions may be conducted sequentially. Usually chlorination and chlorosulfonation of the polyethylene are conducted simultaneously at elevated temperatures, at about 60°–115° C., with gaseous chlorine or a chlorine-generating material, and sulfur dioxide and/or sulfuryl chloride. The process can be carried out in a solvent inert to the reactants, or in a suspension in an inert nonsolvent, or without a solvent, all of which processes are known and described, for example, in U.S. Pat. Nos. 3,759,888 and 3,347,8345. Conventional free-radical initiators are commonly used in the process, such as organic peroxides or aliphatic azo compounds. Suitable solvents that can be used in the process include chlorinated solvents, aromatic hydrocarbons and, specifically, carbon tetrachloride, tetrachloroethane, chloroform, chlorobenzene and trifluorochloroethane, or mixtures thereof. Suspension chlorination is generally conducted in water.

When chlorosulfonated polyethylene is prepared, the sulfonyl chloride groups introduced by these processes allow the polymer to be cured, if desired, usually with polybasic metal oxides, especially litharge (PbO), magnesium oxide, or polybasic metal salts of weak acids, such as tribasic lead maleate. The amount of sulfur in the form of sulfonyl chloride groups in the chlorinated elastomer is from 0.2–5% by weight, usually about 1% by weight.

The polymer composition usually contains two chlorinated polyethylene elastomers or two chlorosulfonated polyethylene elastomers or one of each. However, in all instances in order to obtain the desired compatibility with the resulting physical properties, the chlorine level of these elastomers must be within the ranges disclosed and, most importantly, the percent chlorine substituted on the elastomers must differ by at least 5 weight percent, preferably by at least 7 weight percent. It is thought that the percent chlorine in each elastomer and the minimum difference in percent chlorine substitution on the elastomers facilitate the morphological stability of the blend which results in an improvement in the low temperature properties and oil swell resistance.

The polymeric compositions of this invention also contain 1–30 parts by weight, preferably 5–25 parts by weight per 100 parts by weight total chlorinated polymers identified hereinabove as (a), (b) and (c), of an ethylene terpolymer comprising 48–74 weight percent ethylene, 20–40 weight percent vinyl acetate or alkyl acrylate wherein the alkyl group contains 1–10 carbon atoms, preferably 1–4 carbon atoms, and 6–14 weight percent, preferably 8–12 weight percent, carbon monoxide.

It has been found that it is necessary to add to the polymer composition the ethylene terpolymer described above in the amounts disclosed in order to increase the compatibility of the chlorinated and/or chlorosulfonated polyethylene elastomers with polyvinyl chloride and have an optimum balance of good low temperature properties and resistance to oil swell. Not only is the ethylene terpolymer a necessary component of the composition in the amounts taught, but, also, the ratio of monomers in the ethylene terpolymers should be within the ranges disclosed. For example, if the amount of carbon monoxide is much less than about 6 weight percent, then the ethylene terpolymer is not sufficiently miscible with the chlorinated and/or chlorosulfonated polyethylene elastomers and the polyvinyl chloride. Also, if the ethylene terpolymer contains much less than about 20 weight percent alkyl acrylate or vinyl acetate, the resulting ethylene terpolymer is not sufficiently elastomeric because the crystalline structure of the ethylene is not adequately disrupted. The ethylene terpolymer functions as a compatibilizer for the chlorinated and/or chlorosulfonated polyethylene elastomers and the polyvinyl chloride to enhance the physical properties of the polymer blend resulting in a composition that has excellent low temperature properties balanced against good oil swell resistance.

The ethylene terpolymers used in the polymer composition can be prepared by passing a compressed mixture of ethylene, alkyl acrylate or vinyl acetate and carbon monoxide along with a free radical generating catalyst into an autoclave held at an elevated temperature and pressure, for example, 125°–155° C. and 140–250 MPa, while removing product polymer and unreacted monomers at the same rate. The flow of ethylene, alkyl acrylate or vinyl acetate, and carbon monoxide into the reactor is carefully controlled so that they enter the reactor in constant continuous molar ratios and at the same continuous rate at which polymer and unreacted monomers are discharged from the reactor.

A free radical polymerization catalyst is employed in preparing the ethylene terpolymers. The catalyst can be any of those commonly used in the polymerization of ethylene, such as peroxides, peresters, azo compounds, or percarbonates. Representative catalysts include ditertiary butyl peroxide, alpha,alpha'-azobisisobutyronitrile or other compounds of comparable free radical activity.

Mixing of the polymer components of the blend, i.e, polyvinyl chloride, chlorinated elastomers and ethylene terpolymer, can be accomplished by any suitable means, for example, in a rubber mill or an internal mixer.

The polymer blend may also be compounded with conventional curing agents, and accelerators used in curing chlorinated elastomers. If a curing agent is added, it may be any of the conventional curing agents employed to crosslink chlorinated or chlorosulfonated polyethylene elastomers. Representative peroxide curing agents include compounds such as 2,5-dimethyl-2,5-di-(t-butyl peroxy)hexyne-3; 2,5-dimethyl-2,5-di-(t-butyl peroxy)hexane; di-t-butylperoxide; 2,5-di-(t-amylperoxy)-2,5-dimethylhexane; 2,5-di-(t-butylperoxy)-2,5-diphenylhexane; bis(alpha-methylbenzyl)peroxide; bis-(t-butylperoxy)-diisopropylbenzene. The amounts used are generally from about 1–8 parts per 100 parts chlorinated elastomer (phr) usually about 4–6 phr. Also, sulfur or sulfur-generating materials such as thiuram polysulfides, amine disulfides and sodium polysulfide and other such compounds known in the art can be used as a curing agent for chlorosulfonated polyethylenes. Usually, such curing agents are added in amounts of from about 0.5–2 parts per 100 parts chlorosulfonated polyethylene.

Optionally, one or more conventional accelerators can be added to the polymer blend in amounts of about 0.1–5 parts by weight per 100 parts by weight of the total chlorinated elastomer to improve the rate of cure. Representative accelerators include tetramethyl thiuram monosulfide; 2-mercaptothiazoline; 2-mercaptothiazole; 2-mercaptobenzothiazole and dithiocarbamates.

Coagents for the chlorinated elastomers can be used during peroxide curing procedures. Such coagents are well known in the art and include, for example, triallylisocyanurate, triallylcyanurate, N,N'-m-phenylenedimaleimide, and the like.

Fillers, pigments, stabilizers, and processing aids of the type added to the chlorinated polyethylene elastomers can be incorporated in the polymer blend of the present invention, generally in amounts of from about 20-100 parts per 100 parts chlorinated elastomer. Representative fillers include carbon black, calcium carbonate, calcined clay, hydrated silicas and alumina. Pigments such as titanium dioxide and stabilizers such as dialkyldithiopropionate and thiodiethylenebis[3,5-di-t-butyl-4-hydroxyhydrocinnamate] can be added to the polymer blend. Processing aids such as hydrocarbon oils and stearic acid can be added to the polymer blend to improve processing of the composition by making it more easily workable.

The following examples are illustrative of the invention. Parts and percentages are by weight, unless otherwise specified.

EXAMPLES

Example 1

A rubber compound was prepared by mixing 12.5 parts chlorosulfonated polyethylene (chlorine content 43 weight percent, sulfur content 1 weight percent, Mooney viscosity 77), 37.5 parts chlorosulfonated polyethylene (chlorine content 35 weight percent, sulfur content 1 weight percent, Mooney viscosity 55), 50 parts polyvinyl chloride, inherent viscosity 0.68 (as determined by ASTM D-1243-66T, Method A), 5 parts by weight per 100 parts of the total weight of both chlorosulfonated polyethylenes and polyvinyl chloride, of an ethylene/vinyl acetate/carbon monoxide terpolymer (weight ratio 66/24/10), 3.75 parts lead fumarate, 3.75 parts lead phosphite, 0.5 pentaerythritol mono-di-stearate, 0.5 parts calcium stearate, and 1.5 parts polyethylene (Brookfield viscosity 40 cps at 140° C.) on a two-roll rubber mill at 170° C. for 10 minutes. The compounded stock was compression molded into 150×150×1.9 mm slabs at 160° C. for 3 minutes. Specimens were died out of the slabs and tested for volume oil swell after immersion in ASTM #3 oil at 70° C. for seven days and for solenoid brittle point (ASTM D-746). Results are shown in Table I. Comparative Example 1

A rubber compound identical to that described in Example 1, but lacking the ethylene/vinyl acetate/carbon monoxide terpolymer, was prepared by mixing the ingredients on a two-roll rubber mill at 170° C. for 10 minutes. Test specimens were prepared as described in Example 1. Volume swell and brittle point data are shown in Table I.

TABLE I

| Example | Ex. 1 | Comp. Ex. 1 |
|---|---|---|
| Chlorosulfonated Polyethylene (43 Wt % Cl) | 12.5 | 12.5 |
| Chlorosulfonated Polyethylene (35 Wt % Cl) | 37.5 | 37.5 |
| Polyvinyl Chloride | 50 | 50 |
| Ethylene/Vinyl Acetate/Carbon Monoxide Terpolymer (66/24/10) | 5 | — |
| Lead Fumarate | 3.75 | 3.75 |
| Lead Phosphite | 3.75 | 3.75 |
| Pentaerythritol Mono-di-Stearate | 0.5 | 0.5 |
| Calcium Stearate | 0.5 | 0.5 |
| Polyethylene | 1.5 | 1.5 |
| Volume Swell After 7 Days in ASTM #3 Oil at 70° C. % Increase | 38.7 | 42.9 |
| Solenoid Brittle Point (ASTM D-746) | | |
| Failure at: | | |
| −10° C. | — | — |
| −15° C. | — | — |
| −20° C. | — | — |
| −45° C. | — | — |
| −50° C. | — | 30 |
| −55° C. | 10 | — |

Example 2

A rubber compound was prepared by mixing 50 parts polyvinyl chloride (inherent viscosity 0.68), 12.5 parts chlorinated polyethylene (43 weight % Cl, Mooney viscosity 87), 37.5 parts chlorosulfonated polyethylene (35 weight % Cl, 1% sulfur, Mooney viscosity 55), 5 parts by weight per 100 parts of the total weight of polyvinyl chloride, chlorinated polyethylene and chlorosulfonated polyethylene, of an ethylene/vinyl acetate carbon monoxide terpolymer (weight ratio 66/24/10), 3.75 parts lead fumarate, 3.75 parts lead phosphite, 0.5 parts pentaerythritol mono-di-stearate, 1.5 parts polyethylene (Brookfield viscosity 40 cps at 140° C.), and 0.5 parts calcium stearate. The compounded stock was compression molded into 150×150×1.9 mm slabs at 160° C. for 3 minutes. Test specimens were died out of the slabs and tested for volume swell after immersion in ASTM #3 oil at 70° C. for seven days and for solenoid brittle point (ASTM D-746). Results are shown in Table II. Comparative Example 2

A rubber compound identical to that described in Example 2, but lacking the ethylene/vinyl acetate/carbon monoxide terpolymer, was prepared as described in Example 2. Test specimens were prepared as described in Example 2. Test results of the compression molded slabs ar shown in Table II.

TABLE II

| Ingredients | Example 2 | Comparative Example 2 |
|---|---|---|
| Polyvinyl Chloride | 50 | 50 |
| Chlorinated Polyethylene (43 weight % Cl) | 12.5 | 12.5 |
| Chlorosulfonated Polyethylene (35 weight % Cl, 1 weight % S) | 37.5 | 37.5 |
| Ethylene/Vinyl Acetate/Carbon Monoxide Terpolymer (weight ratio 66/24/10) | 5 | — |
| Lead Fumarate | 3.75 | 3.75 |
| Lead Phosphite | 3.75 | 3.75 |
| Pentaerythritol Mono-di-Stearate | 0.5 | 0.5 |
| Calcium Stearate | 0.5 | 0.5 |
| Polyethylene | 1.5 | 1.5 |
| Volume Swell After 7 Days in ASTM #3 Oil at 70° C. % Increase | 40.2 | 42.4 |
| Solenoid Brittle Point (ASTM D-746) | | |

TABLE II-continued

| Ingredients | Example 2 | Comparative Example 2 |
|---|---|---|
| % Failure | | |
| −50° C. | — | 65 |
| −55° C. | 45 | — |

Example 3

A rubber compound was prepared by mixing 25 parts chlorosulfonated polyethylene (chlorine content 43 weight percent, sulfur content 1 weight percent, Mooney viscosity 77), 25 parts chlorosulfonated polyethylene (chlorine content 35 weight percent, sulfur content 1 weight percent, Mooney viscosity 55), 50 parts polyvinyl chloride (inherent viscosity 0.68 as determined by ASTM D-1243–66T, Method A) 5 parts by weight per 100 parts of the total weight of chlorosulfonated polyethylenes and polyvinyl chloride, of an ethylene/n-butyl acrylate/carbon monoxide terpolymer (weight ratio 60:30:10), 5 parts lead phosphite, 0.5 parts calcium stearate, and 1.5 parts polyethylene (Brookfield viscosity 40 cps at 140° C.) on a two-roll rubber mill at 170° C. for 10 minutes. The compounded stock was compression molded into 150×150×1.9 mm slabs at 170° C. for 3 minutes. Specimens were died out of the slabs and tested for volume swell after immersion in ASTM #3 oil at 70° C. for seven days and for solenoid brittle point (ASTM D-746) and elongation of break at 70° C. Results are shown in Table III.

Example 4

The procedure described above in Example 3 was substantially repeated except that 10 parts, based on the weight of chlorosulfonated polyethylenes and polyvinyl chloride, of an ethylene/vinyl acetate/carbon monoxide terpolymer (weight ratio 62.5:28.5:9) was used rather than an ethylene/n-butyl acrylate/carbon monoxide terpolymer. The compounded stock was compression molded and tested in the same manner as described in Example 3. Results are given in Table III.

Example 5

The procedure described above in Example 3 was substantially repeated except that 20 parts by weight per 100 parts of the total weight of chlorosulfonated polyethylenes and polyvinyl chloride, of an ethylene/vinyl acetate/carbon monoxide terpolymer (weight ratio 66:24:10) was used in place of an ethylene/n-butyl acrylate/carbon monoxide terpolymer. The compounded stock was compression molded and tested in the same manner as described in Example 3. Results are given in Table III.

Example 6

The procedure described above in Example 3 was substantially repeated except 15 parts by weight chlorosulfonated polyethylene having 43 weight percent chlorine was used rather than 25 parts, and 60 parts by weight polyvinyl chloride was used rather than 50 parts. The compounded stock was compression molded and tested in the same manner as described in Example 3. Results are given in Table III.

TABLE III

| | Examples | | | |
|---|---|---|---|---|
| | 3 | 4 | 5 | 6 |
| Chlorosulfonated Polyethylene (43% Cl, 1% S) | 25 | 25 | 25 | 15 |
| Chlorosulfonated Polyethylene (35% Cl, 1% S) | 25 | 25 | 25 | 25 |
| Polyvinyl Chloride | 50 | 50 | 50 | 60 |
| Ethylene/Vinyl Acetate/Carbon Monoxide (Weight Ratio 66:24:10) | — | — | 20 | — |
| Ethylene/Vinyl Acetate/Carbon Monoxide (Weight Ratio 62.5:28.5:9) | — | 10 | — | — |
| Ethylene/n-butyl acrylate/carbon monoxide (Weight Ratio 60:30:10) | 5 | — | — | 5 |
| Lead Phosphite | 5 | 5 | 5 | 5 |
| Calcium Stearate | 0.5 | 0.5 | 0.5 | 0.5 |
| Polyethylene | 1.5 | 1.5 | 1.5 | 1.5 |
| Brittle point (ASTM D746) °C. | −44 | −52 | −56.4 | −43.4 |
| Volume Swell (70° C./7 days/ASTM #3 Oil) % Increase | 31.5 | 22.8 | 23.9 | 26.2 |
| Tensile Elongation-At-Break at 70° C. % | 115 | 200 | 220 | 115 |

Example 7

A rubber compound was prepared by mixing 25 parts chlorosulfonated polyethylene (chlorine content 43 weight percent, sulfur content 1 weight percent, Mooney viscosity 77), 35 parts chlorinated polyethylene (chlorine content 35 weight percent, Mooney viscosity 40), 40 parts polyvinyl chloride (inherent viscosity 0.68 as determined by ASTM D-1243–66T, Method A), 15 parts by weight per 100 parts of the total weight of chlorosulfonated polyethylene and chlorinated polyethylene and polyvinyl chloride, of an ethylene/vinyl acetate/carbon monoxide terpolymer (weight ratio 66:24:10), 5 parts lead phosphite, 0.5 parts calcium stearate and 1.5 parts polyethylene (Brookfield viscosity 40 cps at 140° C.) on a two-roll rubber mill at 170° C. for 10 minutes. The compounded stock was compression molded into 150×150×1.9 mm slabs at 170° C. for 3 minutes. Specimens were died out of the slabs and tested for volume swell after immersion in ASTM #3 oil at 70° C. for seven days and for solenoid brittle point (ASTM D-746) and elongation at break (ASTM D-412). Results are shown in Table IV.

TABLE IV

| | Example 7 |
|---|---|
| Chlorosulfonated Polyethylene (43% Cl, 1% S) | 25 |
| Chlorinated Polyethylene (35% Cl) | 35 |
| Polyvinyl Chloride | 40 |
| Ethylene/Vinyl Acetate/Carbon Monoxide (Weight Ratio 66:24:10) | 15 |
| Lead Phosphite | 5 |
| Calcium Stearate | 0.5 |
| Polyethylene | 1.5 |
| Brittle Point (ASTM D746) °C. | −50 |
| Volume Swell (70° C./7 days/ASTM #3 Oil) % Increase | 61.9 |
| Tensile Elongation-At-Break at 70° C. % | 300 |

Example 8

A rubber compound was prepared by mixing 30 parts chlorinated polyethylene (chlorine content 35 weight percent, Mooney viscosity 40), 20 parts chlorinated polyethylene (chlorine content 43 weight percent, Mooney viscosity 87), 50 parts polyvinyl chloride (inherent viscosity 0.68 as determined by ASTM D-1243-66T, Method A), 25 parts by weight per 100 parts of the total weight of chlorinated polyethylenes and polyvinyl chloride, of an ethylene/vinyl acetate/carbon monoxide terpolymer (weight ratio 66:24:10), 5 parts lead phosphite, 0.5 parts calcium stearate and 1.5 parts polyethylene (Brookfield viscosity 40 cps at 140° C.) on a two-roll rubber mill at 170° C. for 10 minutes. The compounded stock was compression molded into 150—150×1.9 mm slabs at 170° C. for 3 minutes. Specimens were died out of the slabs and tested for volume swell after immersion in ASTM #3 oil at 70° C. for seven days for solenoid brittle point (ASTM D-746) and elongation at break (ASTM D-412). Results are shown in Table V.

Example 9

The procedure described above in Example 8 was substantially repeated except that 10 parts by weight per 100 parts of the total weight of chlorinated polyethylenes and polyvinyl chloride, of an ethylene/n-butyl acrylate/carbon monoxide terpolymer (weight ratio 60:30:10) was used in place of an ethylene/vinyl acetate/carbon monoxide terpolymer. The compounded stock was compression molded and tested in the same manner as described in Example 8. Results are given in Table V.

TABLE V

|  | Examples | |
|---|---|---|
|  | 8 | 9 |
| Chlorinated Polyethylene (35% Cl) | 30 | 30 |
| Chlorinated Polyethylene (43% Cl) | 20 | 20 |
| Polyvinyl Chloride | 50 | 50 |
| Ethylene/Vinyl Acetate/Carbon Monoxide (Weight Ratio 66:24:10) | 25 | — |
| Ethylene/n-butyl Acrylate/Carbon Monoxide (Weight Ratio 60:30:10) | — | 10 |
| Lead Phosphite | 5 | 5 |
| Calcium Stearate | 0.5 | 0.5 |
| Polyethylene | 1.5 | 1.5 |
| Brittle Point (ASTM D746) °C. | −48.4 | −39.8 |
| Volume Swell (70° C./7 days/ASTM #3 Oil) % Increase | 56.6 | 67.4 |
| Tensile Elongation-At-Break at 70° C. % | 250 | 345 |

We claim:

1. A polymer composition comprising
   (a) 35–65 parts by weight polyvinyl chloride,
   (b) 10–55 parts by weight of a chlorinated elastomer selected from the group consisting of a chlorinated polyethylene elastomer or a chlorosulfonated polyethylene elastomer or mixtures thereof wherein the total amount of chlorine substituted on the chlorinated elastomer is from 24–40 weight percent,
   (c) 10–55 parts by weight of a chlorinated elastomer selected from the group consisting of a chlorinated polyethylene elastomer or a chlorosulfonated polyethylene elastomer or mixtures thereof wherein the total amount of chlorine substituted on the elastomer is from 40–52 weight percent,
   with the proviso that the chlorine level in elastomers (b) and (c) differ by at least 5 weight percent, and
   (d) 1–30 parts by weight per 100 parts by weight of total chlorinated polymers (a), (b) and (c) of an ethylene terpolymer containing 48–74 weight percent ethylene, 20–40 weight percent vinyl acetate or alkyl acrylate wherein the alkyl group contains 1–10 carbon atoms, and 6–14 weight percent carbon monoxide.

2. A polymer composition of claim 1 wherein elastomer (b) contains 29–36 weight percent chlorine.

3. A polymer composition of claim 1 wherein elastomer (c) contains 42–47 weight percent chlorine.

4. A polymer composition of claim 1 wherein the chlorine content of elastomers (b) and (c) differ by at least 7 weight percent.

5. A polymer composition of claim 1 wherein the ethylene terpolymer is ethylene/vinyl acetate/carbon monoxide.

6. A polymer composition of claim 1 wherein the ethylene terpolymer is an ethylene/alkyl acrylate/carbon monoxide terpolymer.

7. A polymer composition of claim 6 wherein the ethylene terpolymer is ethylene/n-butyl acrylate/carbon monoxide.

8. A polymer composition of claim 1 wherein chlorinated elastomers (b) and (c) are chlorosulfonated polyethylene.

9. A polymer composition of claim 1 wherein chlorinated elastomers (b) and (c) are chlorinated polyethylene.

10. A polymer composition of claim 1 wherein the one chlorinated elastomer is chlorosulfonated polyethylene and the other chlorinated elastomer is chlorinated polyethylene.

11. A polymer composition of claim 1 wherein the ethylene terpolymer is present in an amount of 5–25 parts by weight per 100 parts by weight of total chlorinated polymers (a), (b) and (c).

12. A polymer composition of claim 11 wherein the ethylene terpolymer is ethylene/n-butyl acrylate or vinyl acetate/carbon monoxide.

13. A polymer composition of claim 1 containing 12–35 parts by weight of chlorinated elastomers (b) and (c).

14. A polymer composition of claim 1 wherein the ethylene terpolymer contains 55–65 weight percent ethylene, 25–35 weight percent alkyl acrylate or vinyl acetate and 8–12 weight percent carbon monoxide.

* * * * *